GERARD V. DELAIRE
ROBERT G. PEACE
INVENTORS

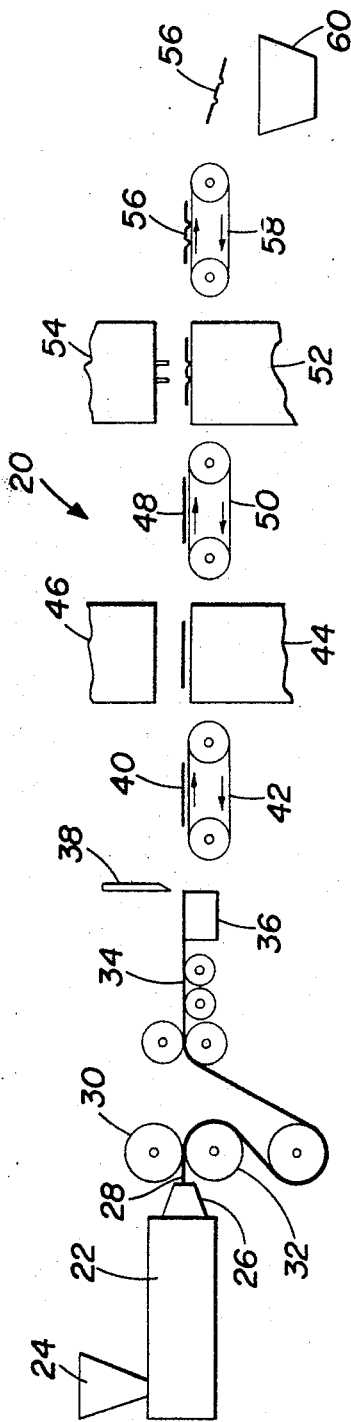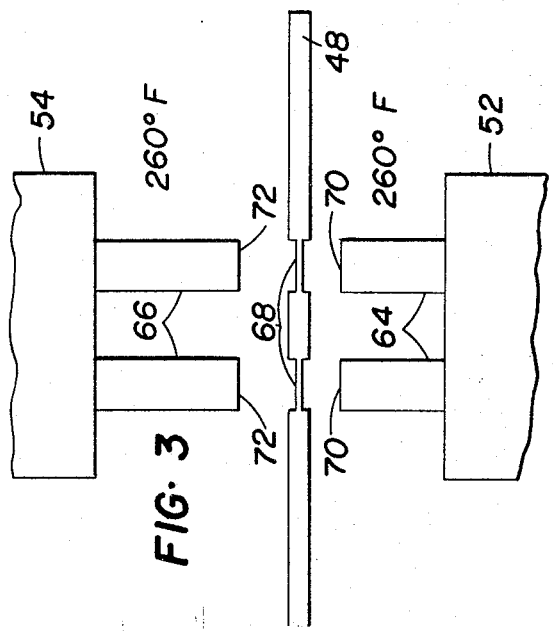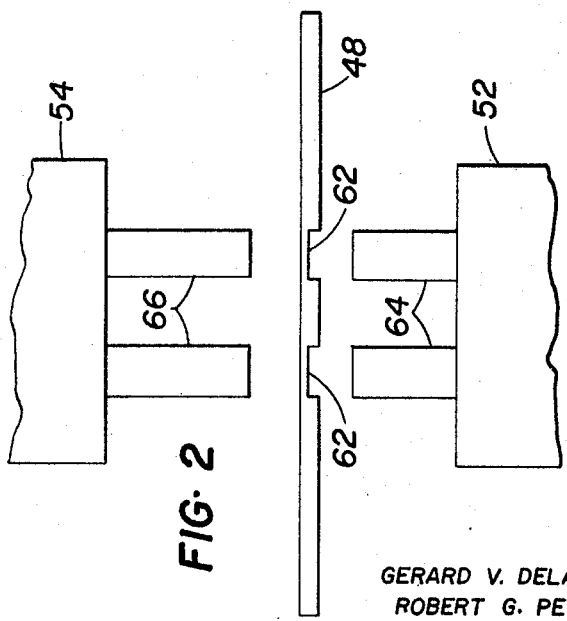

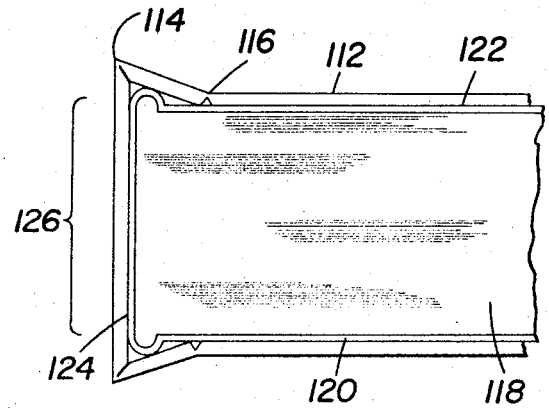
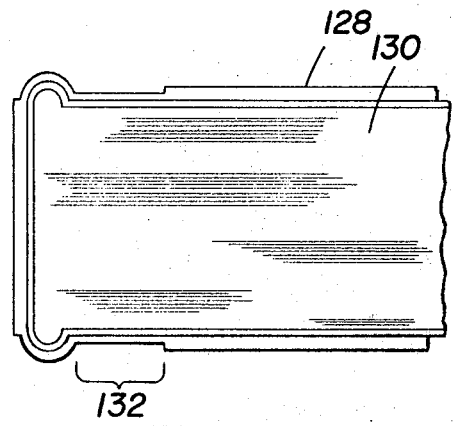
FIG. 10     FIG. 11
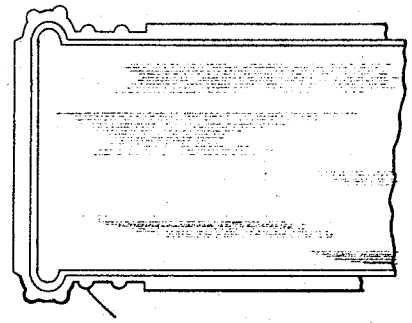
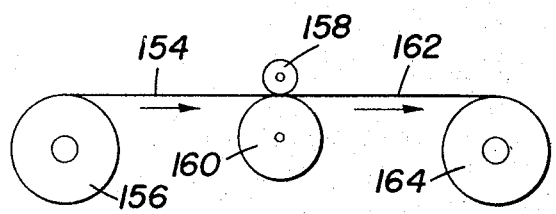
FIG. 12     FIG. 14
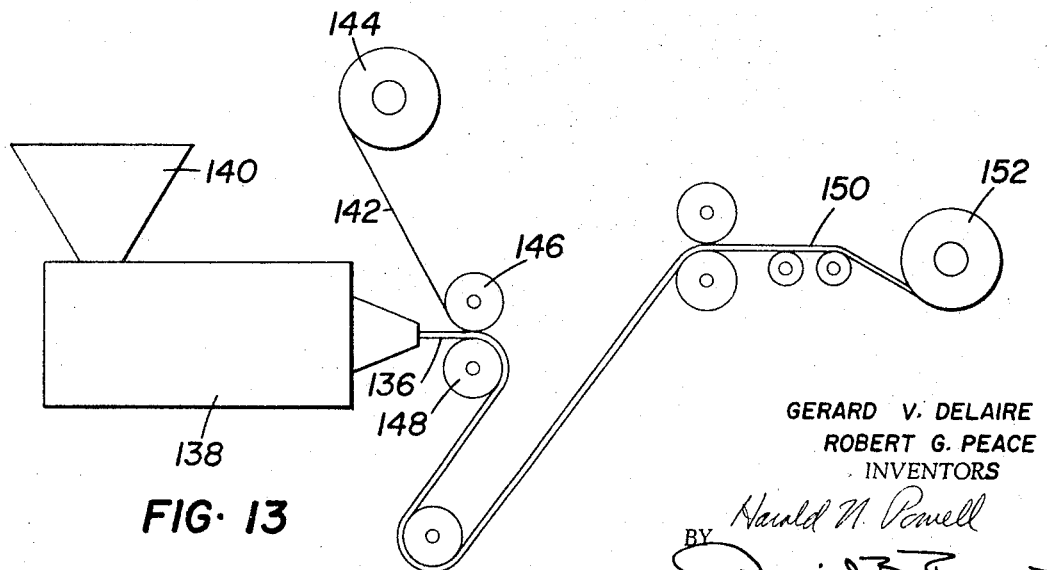
FIG. 13
GERARD V. DELAIRE
ROBERT G. PEACE
INVENTORS

United States Patent Office 3,454,694
Patented July 8, 1969

3,454,694
METHOD OF FORMING PLASTIC BOOK BACKS
Gerard V. Delaire and Robert G. Peace, Kingsport,
Tenn., assignors to Eastman Kodak Company, Rochester, N.Y., a corporation of New Jersey
Continuation-in-part of application Ser. No. 531,467,
Mar. 3, 1966. This application Aug. 16, 1967, Ser.
No. 663,922
Int. Cl. B29c 17/14
U.S. Cl. 264—151                    4 Claims

ABSTRACT OF THE DISCLOSURE

Plastic book back or covers formed of extruded polyallomer plastic sheets and having a hinge portion impressed therein which is strong and durable because of the orientation of the molecules of the material, the hinge portion being impressed perpendicular to the direction of extrusion. The book-back is formed by extruding a polyallomer into sheet form, cutting the sheet into blanks, and impressing hinge areas perpendicular to the direction of extrusion by utilizing heated impressing bars.

---

This application is a continuation-in-part of our co-pending application Ser. No. 531,467 filed Mar. 3, 1966 and now abandoned.

This invention relates broadly to a process of and apparatus for producing novel plastic sheeting or covering materials. More particularly, this invention relates to specially formed book backs and covers made from polyallomer plastic compositions.

As more fully explained in co-pending application Ser. No. 302,393 (filed Aug. 15, 1963) by Gerard V. Delaire and Gordon K. Sharpe entitled, "Manufacture of Book Backs and Covers," prior to the present inventions which teach how plastic covers can be manufactured and used it has been a universally accepted practice in the book manufacturing industry to use book backs made from paperboard covered with cloth. Such book backs were generally formed by impregnating the paper and cloth after which these items were laminated together by conventional laminating procedures. In certain instances, such as where more expensive volumes were being bound, book covers made of leather or other such more costly materials have been used in place of these laminated paper-cloth book backs.

The process as described in the companion application 302,393 has utility in the manufacture of certain types of covers and in the worknig of certain plastified plastic masses as contrasted to the casting of molten plastic materials. However, for certain purposes which will be more fully set forth hereinbelow it has been found that the development of a still further improved process for making book covers from plastics, and particularly the production of new type plastic book cover products, is very desirable. Hence the development of more rapid and versatile methods for manufacturing book covers as well as the development of new book cover constructions was undertaken. This research eventually led to the discovery of several new procedures whereby plastic book covers may be more rapidly and economically fabricated. Several new forms of construction and designs for plastic book covers was also discovered as a result of this research project.

In the broader aspects of our invention we have found the following: The plastic material from which the book cover or back is to be fabricated may, so to speak, be prefabricated to a substantial extent with existing commercial equipment to obtain a plastic blank or plastic blanks. Then, the plastic blank is subjected to special steps of the present invention to make the book cover. As will be hereinafter noted, all of the steps of our process may be set up in a continuous line of operation thereby increasing the efficiency of the process. As will be further observed, numerous new book cover arrangements are possible for manufacture.

Therefore an object of this invention is to provide a new method for manufacturing plastic book backs, plastic covers, plastic sheeting materials and like products.

Another object of this invention is to provide a method for producing plastic book backs and plastic sheeting materials that will not warp, shrink, or change colors and is free of any objectionable odors.

A further object of this invention is to provide a method of manufacturing book and sheet products from plastics that is rapid, inexpensive and which requires a relatively small amount of equipment, much of which may be commercially available equipment.

A still further object of this invention is to provide a method for producing plastic covers and sheeting materials which permits the utilization of some standard equipment and certain conventional processing steps in its operation.

Yet still another object of this invention is to provide a method of producing covers from extruded sheeting which offers extreme versatility with respect to different sizes, and wherein many size covers can be produced with only minor, inexpensive equipment changes.

These and further objects and advantages of this invention will be more apparent upon reference to the following description, specific working examples, appended claims, and drawings wherein:

FIGURE 1 is a semi-diagrammatic side elevation view somewhat in the nature of a flow sheet showing the over-all operation of the process from the extrusion of the polymer into plastic blanks to and including the forming of the blanks into the cover construction;

FIGURES 2 and 3 are diagrammatic side elevation views on a somewhat enlarged scale showing certain forming steps applied to a plastic book cover blank;

FIGURES 10, 11 and 12 are semi-diagrammatic side elevation views showing the attachment of the plastic book covers of the present invention to the book contents within the covers;

FIGURE 13 illustrates a process for adding a substrate to a plastic sheet; and

FIGURE 14 illustrates a process for embossing a roll of plastic sheeting that has a smooth surface finish.

Figure 4:
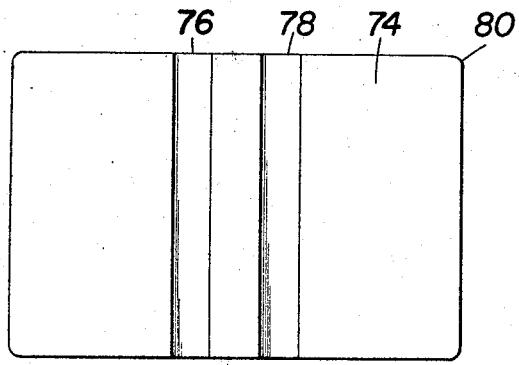
FIGURE 4 is a top view of a resultant finished book cover fabricated by the present invention.

With continued reference to the accompanying figures wherein like reference numerals designate similar parts throughout the various views, and with initial attention directed to FIGURE 1, reference numeral 20 is used to generally designate a plastic book cover or sheeting process constructed in accordance with one concept of the present invention. This process 20 consists of a conventional extrusion device 22 for forming plastic blanks which will be more fully described hereinbelow. The polyallomer plastic from which these blanks are to be formed may be fed into the extrusion device 22 through a hopper device 24 after which the plastic pellets or powder is fluidized within the extruder and is extruded through a die 26 to produce a molten sheet or web of plastic shown at 28.

After the continuously extruded sheet or web 28 has sufficiently hardened it is fed through embossing rolls 30 and 32. These embossing rolls 30 and 32 may be of a construction for providing whatever outside finish that is desired on the continuously extruded sheet. That is, the embossing rolls may have on their surface the proper configuration to secure outside finish effects such as leather grain effect, cloth-leather effect, matte surface effect and the like. The embossing rolls 30 and 32 impart their finish to the surface of the heated plastic sheeting during this phase of the operation as the sheet 28 passes through the nip in the rolls. Hence, various decorative pattern surfaces may be incorporated as an integral part of the plastic sheet 28 made during the extrusion operation. It has been discovered that such decorative patterns on the outside of a plastic book back offers not only a pleasing finish but also a finish that has utility in that it tends to resist scuffing and abrasion of the plastic.

The sheetting 34 with the patterned surface is then passed between cutting or dieing devices 36 and 38. At this zone in the process there may be sheared or die cut out of the sheet 34 one or more plastic blanks 40 having the size and shape for the book cover being produced. For example, if it is desired that the book back have rounded corners the cutter 38 is designed to cut the plastic blank from the sheet with such rounded corner construction. As indicated, the cutting operation performed by the devices 36 and 38 may be multiple so that a plurality of plastic blanks are cut at one operation.

The plastic blanks 40 that are cut from the sheet 34 are preferably discharged onto a conveyor 42 which conveys the blanks to a decorating and printing device 44 and 46. This operation may consist of foil stamping, silk screening, or other decorating methods suitable for polyallomer sheeting. It is also possible to deboss or emboss panel areas at this station is such is desired. After the printing and decorating has been accomplished, the decorated blanks 48 are then discharged onto a second conveyor 50 which conveys the blanks to one or more hinge forming bars 52 and 54. The hinge forming operation will be described in further detail in connection with FIGURES 2 through 4.

It should be mentioned at this point that it is possible to use the integrated process 20 to continuously produce finished book covers from plastic pellets. It is also possible to produce only the embossed sheeting which may be stored and cut to blank size at a later date. After the stored sheeting has been cut to size, it could then be decorated, hinged and "cased-in" in the usual manner. It is also possible to rearrange the operation so that the sheet may be decorated before it is cut into blanks, or so that the blanks are hinged before the decorating is accomplished. In any case, after the hinge forming has been accomplished by devices 52 and 54 the finished or substantially finished book cover 56 is preferably discharged by a chute or conveyor 58 into a receptacle or other means 60 which may be used for carrying the covers to the casing-in or like type operation.

Reference is now made to FIGURES 2 through 4 wherein hinge stamping in accordance with the present invention is illustrated in detail. The decorated plastic blank 48 of FIGURE 1 is conveyed between the two forming bars 52 and 54 illustrated on a slightly enlarged scale in FIGURE 2. In FIGURE 2 the hinge 62 is formed on the upper side of the plastic blank 48. This is done by heating the lower stamping bar die 64 to a temperature approximately 40° higher than the upper bar die 66. When the hinge is effected by the closing of bar dies 64 and 66 against the plastic blank 48, the higher temperature of the lower bar and die causes the plastic material to flow more readily thereby causing the hinge area at 62 to be flush with the upper surface of the plastic blank 48.

As believed further apparent from FIGURE 2, a hinge could be made flush with the lower side of sheet 48 by reversing the temperatures of forming bars 52 and 54. That is, depending on the composition of the plastic being worked with, the upper bar 54 would be heated to a higher temperature gradient, as for example within the range of 255 and 265° F. while the lower bar 52 is held at a temperature approximately 40° F. lower and the procedure just referred to followed to obtain hinge formation on the opposite side of the plastic blank. It should be pointed out that the temperatures mentioned above (255 to 265° F.) are necessary only when wide hinges (¼" and greater) are to be formed. Much lower temperatures may be used to form various hinges such as those illustrated in FIGURES 8 and 10.

Referring to FIGURE 3, the hinge can be formed in the middle of plastic blank 48 by using stamping bars 52 and 54 with equalized temperature. As illustrated in FIGURE 3, both dies 64 and 66 of the two bars are maintained at a 260° F. temperature. This permitted the formation of the hinge 68 at approximately the midpoint of the thickness of plastic blank 48. A particular noteworthy detail of our invention is that the widths of the tips 70 and 72 of each opposing die 64 and 68 should be approximately the same and not vary in dimension more than a plus or minus 2 percent. It has been found that in stamping relatively wide hinges in plastic as illustrated in FIGURES 2 and 3 that it is desirable to have the stamping dies 64 and 66 of the same width. If either stamping surface 70 or 72 is wider than the other, it is not possible to achieve best results in stamping a wide hinge. The temperatures and temperature differentials on FIGURES 2 and 3 are illustrative. As indicated, depending on the particular plastic composition used, the width of the hinge portion and the like higher or lower temperatures and temperature differentials may be employed.

Figure 5:
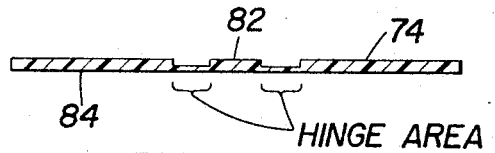
FIGURE 5 is a sectional view of the book cover of FIGURE 4.

From the foregoing description and referring to FIGURES 4 and 5 it will be observed that the finished book cover 74 may have in addition to the wide hinges 76 and 78 rounded corners as at 80. As compared to currently manufactured book covers this is believed to be an improvement. The present invention permits the achieving of round corners in the cutting and forming of book backs from plastic sheet stock wherein the prior art shape corners are the usual condition in existing book covers. When square cornered book backs are subjected to impact as would be experienced in the normal life of a book, an effect known as "dog earring" or turning of the corners occurs. This impairs the appearance and life of the book considerably. It has also been found that the square cornered book backs are somewhat dangerous in that their sharp points can cause injury. This is particularly true where the books are to be used by young children.

Referring to FIGURE 5, it will be further observed that the spine position 82 may be of the same thickness as the sidewalls 84 of the book cover. In prior book cover constructions the spine has usually been of a diminished thickness thereby reducing the capability of the cover to resist wear and tear in this vulnerable area.

Figure 6:
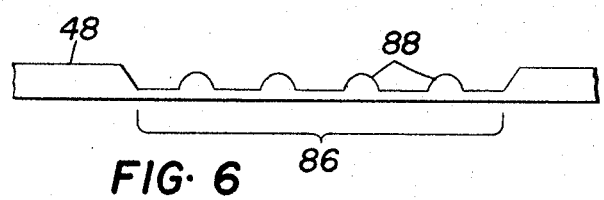
FIGURE 6 is a partial sectional view of another book cover hinge construction.

While for many book constructions the design illustrated in FIGURES 4 and 5 may be simply and economically produced, this invention is not limited to such specific construction. As illustrated in FIGURE 6, a wider and more complex hinge construction such as illustrated at 86 may be formed into the plastic blank 48. This may be done by making the forming bars 52 and 54, as well as their associated dies, wider and provided with indentations for forming the rounded portion 88.

Figure 7:
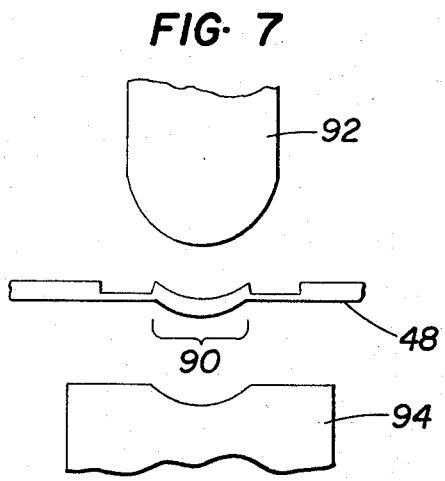
FIGURE 7 is a sectional view of the book cover of FIGURE 4 with the addition of a rounded spine section.

It is also possible to manufacture plastic book backs with a rounded spine section as illustrated in FIGURE 7 which shows a cross section of the book back 74 shown in FIGURE 4 with the exception of the spine section 90 has been rounded. This is accomplished by using a matched set of dies 92 (male) and 94 (female) which are heated to a temperature of approximately 240° F. The heated dies 92 and 94 are brought into contact with the plastic blank 48 thereby causing it to be heated to a semi-pliable state along the spine section 90. The entire plastic blank is then transferred to a second set of dies identical to 92 and 94 except that they are maintained at a temperature of approximately 70° F. These "cooled dies" are then brought into contact with the sheeting thereby causing it to be cooled and set in a curved shape. Once the heated spine section 90 is cooled in this curved shape it retains this shape permanently. Several variations of this method for producing a rounded spine are also possible. Included would be heating the sheeting in the spine section 90 by a method other than contact heating such as by convection or radiant heating. With this method, only one set of dies would be necessarry, those being the cooling dies.

Figure 8:
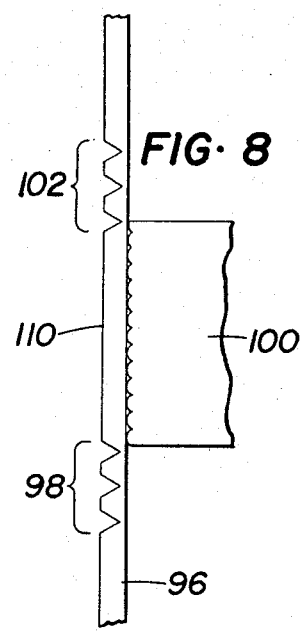
FIGURE 8 is a sectional view of a multi-hinged book cover.

It is also possible to produce plastic book backs with a hinge design different than those shown in FIGURES 5 through 7. For example, a plastic back 96 with a multiple hinge effect 98, as illustrated in FIGURE 8, can be placed on a book 100. With this design, additional material is left in the hinge area 102 which protects the hinge from abrasion and scuffing. A greater or lesser number of the hinges 98 may be incorporated into the hinge area 102 depending upon the requirements of the book.

Figure 9:
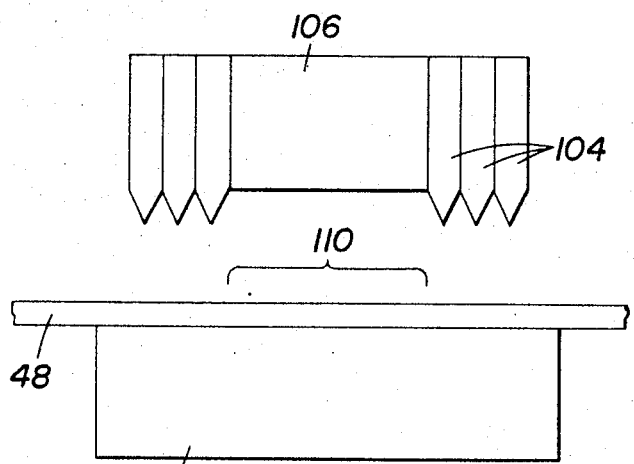
FIGURE 9 shows a method for producing the hinges of FIGURE 8.

To create this multiple hinge effect, a system as illustrated in FIGURE 9 is normally used. As seen in this figure, the hinge dies 104 are spaced by a spacer block 106 as required by the thickness of the book. The plastic blank 48 which has been cut to size is placed on the stamping block 108. The hinge dies 104, the spacer block assembly 106, and the stamping block 108 are closed together thereby thinning the blank and causing the hinge effect. With this method the hinge dies 104, spacer block 106, and stamping block 108 are heated to a temperature of approximately 130° F. to prevent shearing of the plastic blank 48. This method of producing the hinge yields an exceptionally strong hinge as the hinge is formed with very little heat and very high pressure, thereby cold working the material in the hinge area.

As can be seen from FIGURE 9, this system is extremely versatile as the number of hinges can be varied depending upon the number of stamping dies 104 used. It is also possible to vary the distance between the hinges by changing the width of the spacer block 106. By using different arrangement of spacer blocks 106 and stamping dies 104 it is possible to incorporate hinges in the spine area 110 (also see FIGURE 8) of the book back, thereby causing the back to be flexible.

Regardless of the manner in which the hinge is formed or how many hinges are formed, it has been found to be much preferred to form the hinge or hinges across the machine direction of the extruded polyallomer sheet. By machine direction is meant parallel to the direction in which the sheeet or web of plastic 28 flows from the die 26. As shown in the following table, hinges stamped across or perpendicular to the machine direction of the sheet are about 30% stronger than hinges stamped in the direction or parallel to the machine direction of the sheet. The test was to failure and was performed on

HINGES PARALLEL TO MACHINE DIRECTION

| Sample: | Failure point, lbs. |
|---|---|
| A | 127 |
| B | 92 |
| C | 113 |
| D | 106 |
| E | 117 |
| Average | 110 |

HINGES PERPENDICULAR TO MACHINE DIRECTION

| Sample: | |
|---|---|
| F | 136 |
| G | 141 |
| H | 147 |
| I | 154 |
| J | 146 |
| Average | 145 |

In both instances the material was 5B2B polyallomer with hinges formed to the same width and depth. It is noteworthy that the samples in which the hinges were parallel to the machine direction failed by tearing while failure in the samples in which the hinges were perpendicular to the machine direction merely was a stretching rather than a tearing.

While not wishing to be bound by any particular theory as to why hinge strength is greatest when formed perpendicular to the machine direction, it is believed that some molecular orientation of the molecules of the sheet occurs during extrusion, and this orientation is generally parallel to the direction of extrusion or machine direction. As is known, the molecular interattraction of oriented sheets strengthens them to tensile forces applied parallel to the direction of orientation but lessens tensile strength to forces applied perpendicular to the machine direction. Thus, any tears which occur will generally be in the machine direction rather than perpendicular thereto because of the lesser resistance to such in that direction.

The polyallomer plastic utilized in the book back according to this invention has the remarkable property of the ability to form a hinge. This hinge becomes the strongest part of the book back even though it is usually the thinnest part of the article. The superior strength is due to the molecular orientation induced in the hinge by flexing which causes the molecules to align themselves perpendicular to the hinge (in the machine direction) concentrating the molecular chain strength in the direction of alignment rather than in a random configuration which distributes the chain strength in all directions. In forming such a hinge, flexing should be undertaken as soon after forming as possible since the molecules can be oriented much easier and the possibility of breakage will be reduced if the hinge is flexed initially while it still retains some of the heat imparted to it during the forming operation.

Assuming that a plastic cover has been fabricated as above described, the book may be assembled as illustrated in FIGURES 10 through 12. Referring to FIGURE 10 it is seen that the plastic book cover 112 has internally and externally positioned hinges 114 and 116, respectively. The book 118 of conventional make-up with a paper or fabric outer layer 120 (crash cloth) is cemented or otherwise adhered to the plastic cover 112 in the area 122 and/or 124. This adhering of the contents to the plastic cover in our invention may be only over a partial portion of the inside of the plastic cover. Or, it may be over the entire interior of the plastic cover, thereby being generally similar to current paper cover book construction. The point which it is desired to make is that with plastic book covers of the present invention a cost saving can be obtained in adhering the book contents to the plastic cover by merely adhering along a narrow width of the crash cloth since the plastic cover has sufficient strength and appearance as not to necessitate covering the entire or a large portion of the interior of the book.

As mentioned hereinabove, with a conventional back the entire end sheet is adhered to the cover. If the cased-in book is subjected to temperature extremes, the different expansion and contraction rates of the end sheet, adhesive, and cover can cause the cover to warp or curl. If the book is cased in by adhering along the narrow crash cloth only as taught by the present invention, this problem is virtually eliminated. Another definite advantage of adhering only along the crash cloth is the elimination of cover tending to curl when the book is bound. This curl is caused by the different rates of shrinkage and expansion of the paper, adhesive, and cover material especially if the bound book is subjected to temperature changes. With reference to FIGURE 10, it is also possible to produce a "tight back" book by adhering the signatures to the cover in the spine area 126.

Referring to FIGURE 11, the plastic cover 128 has the book contents 130 incorporated therein and joined thereto in an identical manner to that described in FIGURE 10. It is noted that the hinge area 132 in FIGURE 11 has been reduced in thickness by the method shown in FIGURES 2 or 3. This area is much more flexible than the hinge area shown in FIGURE 10 and as a result of this thinned area, the cover conforms to the book profile in the hinge area. This type of construction is substantially comparable to that by which conventional, paper-type covers are presently cased in.

Referring to FIGURE 12 the book construction therein is similar to that described in FIGURES 10 and 11 with the exception being the hinge design 134 is that described in FIGURE 6.

A further understanding of our invention will be had from the following examples which are set forth for the purposes of illustrating some of our preferred embodiments of plastic book cover construction.

Example I

In this example we describe the production of a book cover of general utility and of a design generally similar to FIGURES 4 and 5. The extrusion apparatus of FIGURE 1 was supplied with polyallomer plastic of the properties referred to below. The plastic is fed into the extruder in either a pellet, powder, or small particle size form. Polyallomer plastic is a crystalline, block copolymer of propylene and between about 0.1 and 7.0% ethylene in polymerized form and has a molded density of 0.89–0.90 gram per cubic centimeter making it the lightest commercially available solid plastic. The excellent flow characteristics (a flow rate of 2.5 grams/10 min. at 230° C. and 2.16 kg. load) make polyallomer plastic especially suitable for the extrusion operation.

The polyallomer was extruded at a temperature of approximately 400° F. into a sheet of a thickness 0.050" (gauge). The sheet at a temperature of approximately 350° F. was passed through embossing rolls which carried an artificial leather-type of configuration. The sheet which was produced by this embossing step had a thickness of approximately 0.050" and a pleasing leather appearance due to the color component, hand or feel of polyallomer sheeting, and the embossing effect. The embossed sheet was then cut into a plurality of book covers of the blank size 13⅝"×9⅜" and of the design with rounded corners as illustrated in FIGURE 4. These blanks were then conveyed to the decorating station where they were printed and decorated with a metal foil which was transferred to the blanks by the hot stamping process. The printed blanks were then conveyed to the hinge forming station and hinges were effected across the machine direction by the method described in FIGURE 5. This operation completed the work on the book cover.

The books to be covered and the plastic book backs were then brought together and "cased-in" using commercial casing-in equipment. This casing-in is done by applying a latex-base adhesive to both the spine section and end cover of the book and then causing the adhesive covered book to come in contact with the book back. Pressure is then applied on the book assembly, causing the book cover to become adhered to the book.

The resultant cased-in book was then tested and compared with conventional books with the following information being obtained:

(1) The plastic backs were resistant to water and chemical attack whereas conventional book backs swell and deteriorate.

(2) The plastic back could be cleaned with a detergent solution repeatedly without damage occurring. The conventional backs discolored and frayed when cleaned several times.

(3) Abrasive tests on the book covers showed the polyallomer covers to be considerably improved over conventional backs.

(4) When subjected to impact test, the conventional covers had a tendency to "dog ear" or bend at the corners whereas the polyallomer covers did not.

(5) The polyallomer covers had very good strength in the hinge areas.

Example II

It has been found that in certain instances it is desirable to bond a substrate to either one or both sides of the polyallomer sheet. It has been discovered that many types of substrates including plastic materials, reinforcing materials, metal foils, netting, cloth, paper, etc. can be successfully laminated to a polyallomer plastic sheet using the two following processes. However, for purposes of clarity, these processes will be described as they relate to applying a cloth or paper substrate to a polyallomer plastic sheet.

A. Sheet extrusion.—A conventional sheet or film extrusion operation can be used to laminate cloth or paper to polyallomer plastic. With reference to FIGURE 13, the sheeting 136 would be extruded as described above utilizing an extruder 138 and a feeding device 140. A cloth or paper 142 would be fed from roll stock 144 into the molten plastic sheeting 136 around extrusion roll 146. When this sheeting or web of plastic and cloth is fed through the nip between the extrusion rolls 146 and 148, the heat and pressure causes the molten plastic sheeting 136 to bond to the fibrous surfaces of the paper or cloth 142. Once the sheeting laminate 150 is cooled, a mechanical bond between the two materials has been effected producing the cloth or paper to plastic laminate. This method would be used to obtain laminates greater than 0.006" in thickness. The laminate 150 would then be fed to roll 152 for storage in roll stock form or would be cut into sheeting for storage.

B. Extrusion coating process.—This process is similar to that described above with the exception that a much thinner laminate (less than 0.006") can be obtained. With this process, the molten plastic is fed directly onto the paper or cloth which is then immediately fed through a set of heated pressure rolls. These pressure rolls force the molten plastic into the cloth or paper causing a bond between the two materials to be effected. After laminating as aforementioned, the stock is cut into blanks, hinges formed if needed and the book cover and contents assembled as described above.

Example III

As mentioned hereinabove, in certain instances it may be desirable to use pressure rolls having highly polished surfaces in the apparatus described in FIGURES 1 and 13. The use of such polished rolls will produce an unsupported plastic sheeting or a laminate as described in Example II with a smooth finish which can then be instantly subjected to further working or stored in roll or sheet form. In those instances where the smooth finished unsupported plastic sheeting or laminate is stored, it can be embossed at a later date to give the desired surface effect. FIGURE 14 illustrates one process whereby this embossing operation can be performed.

As seen in FIGURE 14, the smooth finished sheeting 154 or laminate is supplied from a feed roll 156 between an embossing roll 158 and a companion roll 160. The embossing roll 158 has the desired embossed pattern on the surface of the roll and is maintained at a temperature of approximately 225° F. The companion roll 160 has a compressible or resilient surface such as cloth, cotton, or rubber. When the smooth finished sheeting 154 is fed through the nip between the rolls 158 and 160, the raised temperature and the pressure maintained between the rolls cause the surface effect of the embossing roll 158 to be imparted to the plastic sheeting. The embossed sheeting or film 162 thus formed is then cooled and fed to a wind-up roll 164.

There are many advantages to this method of post embossing plastic film or sheeting, some of which are listed below.

(1) An inventory of smooth finished unsupported sheeting or laminate can be maintained and embossed as required.

(2) Small production runs are possible as very little labor, start up, and shut down time is required.

(3) Many different embossing patterns such as matte, hair-cell, leather, linen, pebble, etc. can be obtained.

(4) A significant property change is noted when this post embossing operation is performed on the sheeting. Improved tear and tensile strength and reduced blushing properties are foremost among the property changes.

As will be apparent, the product produced by the aforementioned process can be used for numerous products besides book covers. Examples of such additional uses are wall coverings, tablecloth and coverings, upholstery, clad metal laminates, and other similar applications.

From the foregoing, it is believed that it can be seen that this invention has a number of advantages, some of which are enumerated as follows: (1) Long life and extreme durability, especially in the hinge area; (2) highly resistant to chemicals; (3) highly resistant to greases and oils; (4) soil can be readily washed off; (5) the cover of such a book can be decorated by the usual methods such as die stamping with foil, silk screening, offset printing, etc.; (6) book covers manufactured by our method have been known to withstand four times the abuse of book covers manufactured by the conventional methods; (7) this cover is a one-piece unit incorporating the covers (front and back), backbone and hinges. This type of construction can reduce the assembly costs normally associated with the chipboard and cloth-laminate type of cover; (8) the outside surface of the cover as well as the backbone can have a finish representing a multitude of engraved or embossed surfaces such as morocco grain, hair-cell grain, matte grain, linen and highly polished surfaces. This surface is not superficial but an integral part of the whole structure; (9) the characteristic memory feature of plastics used for our book back minimizes the deformation caused by denting from a surface blow; (10) impervious to moisture; (11) will not warp due to humidity conditions; (12) exceptional wear and scuff resistance as compared with an impregnated cloth-board type of construction; (13) because of this process, a wide choice of cover thickness and hinge stiffness can be achieved; (14) any shape corners can be achieved; (15) a wide range of colors are available; (16) because it is highly resistant to abuse, it offers added protection to the pages of the book; (17) it is possible to eliminate the use of an end sheet by adhering only with the crash cloth of the book to the cover; (18) the color of the cover is an integral part, thereby eliminating the possibility of wearing off or fading. Also, an integral cover which eliminates the possibility of delamination or wearing through the outer surface as has been experienced with covers made of a multi-layer construction. In addition, it will be observed from FIGURES 10 through 12 that we have provided book covers having both internal and external hinge constructions.

Although the present invention has been illustrated and described primarily from the standpoint of its use in producing plastic book covers, it will be understood that this is exemplary of the invention and is by no means restrictive thereof.

We claim:

1. The process of manufacturing plastic book covers and the like articles having at least one relatively wide hinge-like element in the article, which comprises extruding a sheet of polyallomer plastic, embossing at least one surface of the sheet, sub-dividing the embossed sheet into blanks of a size and peripheral configuration at least about the same as the finished cover, imparting the hinge-like element to the blank by pressing appropriately positioned heating bars against the blank to form at least one depression in the plastic of a pre-determined width and depth and extending perpendicular to the direction of extrusion, flexing the hinge element to orient the molecules therein forming molecular chains extending perpendicular to said hinge thereby imparting strength and durability to said hinge, and conducting the article thus fabricated to further book manufacturing operations.

2. The process of claim 1 wherein during the sub-dividing rounded corners are produced on the plastic blank.

3. The process of claim 1 wherein there is a temperature differential between the heating bars.

4. The process of claim 1 wherein the hinge-like area is formed in the middle of said blank by pressing heated bars into opposed sides thereof.

References Cited

UNITED STATES PATENTS

| | | | |
|---|---|---|---|
| 3,320,225 | 5/1967 | Bradbury | 264—295 |
| 2,616,125 | 11/1952 | Colombo | 264—294 |
| 2,120,328 | 6/1938 | Ferngren | 264—327 |
| 3,088,753 | 5/1963 | Sendor | 281—29 |

ROBERT F. WHITE, *Primary Examiner.*

R. SHEAR, *Assistant Examiner*

U.S. Cl. X.R.

264—238, 284, 295